(12) United States Patent
Kim et al.

(10) Patent No.: US 7,086,773 B2
(45) Date of Patent: Aug. 8, 2006

(54) BACKLIGHT ASSEMBLY AND LIQUID CRYSTAL DISPLAY APPARATUS HAVING THE SAME

(75) Inventors: Heu-Gon Kim, Suwon-si (KR); Sang-Hoon Lee, Yongin-si (KR); Jong-Dae Park, Seoul (KR); Jin-Soo Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 190 days.

(21) Appl. No.: 10/733,051

(22) Filed: Dec. 11, 2003

(65) Prior Publication Data

US 2005/0036296 A1    Feb. 17, 2005

(30) Foreign Application Priority Data

Aug. 13, 2003 (KR) .................. 10-2003-0055963

(51) Int. Cl.
  *F21V 8/00*  (2006.01)
(52) U.S. Cl. .................. 362/621; 362/630; 362/632
(58) Field of Classification Search ................ 362/609, 362/610, 621, 622, 623, 630, 632, 633, 634
  See application file for complete search history.

(56) References Cited

U.S. PATENT DOCUMENTS 6,048,071 A * 4/2000 Sawayama .................. 362/603
6,779,902 B1 * 8/2004 Cha et al. .................... 362/600

* cited by examiner

*Primary Examiner*—Thomas M. Sember
*Assistant Examiner*—Guiyoung Lee
(74) *Attorney, Agent, or Firm*—Cantor Colburn LLP

(57) ABSTRACT

The backlight assembly includes a first lamp unit and a second lamp unit. The first lamp unit generates light. The light guide plate has a light exiting surface, a light reflecting surface and side surfaces. The light reflecting surface surfaces the light exiting surface. The side surfaces connect the light exiting surface and the light reflecting surface. The side surfaces include a first light incident surface. The first lamp unit is disposed adjacent to the first light incident surface, and the first light incident surface inclines inwardly from the light exiting surface to form an inclination angle that is smaller than or substantially equal to $(90-2\sin^{-1}(n_2/n_1))°$, wherein '$n_1$' is a refractive index of the light guide plate, and '$n_2$' is a refractive index of a material between the lamp and the light incident surface.

28 Claims, 6 Drawing Sheets

BACKLIGHT ASSEMBLY AND LIQUID CRYSTAL DISPLAY APPARATUS HAVING THE SAME

CROSS-REFERENCE TO RELATED APPLICATIONS

This application relies for priority upon Korean Patent Application No. 2003-55963 filed on Aug. 13, 2003, the contents of which are herein incorporated by reference in its entirety.

BACKGROUND OF THE INVENTION

1. Field of the Invention

The present invention relates to a backlight assembly and a liquid crystal display apparatus having the backlight assembly, and more particularly to a backlight assembly having a reduced size and enhanced optical characters, and a liquid crystal display apparatus having the backlight assembly.

2. Description of the Related Art

A liquid crystal display apparatus displays an image by using a liquid crystal material. The liquid crystal display apparatus includes a display unit for displaying an image, and a backlight assembly disposed under the display unit so as to provide the display unit with a light.

The backlight assembly includes a lamp unit and a light guide plate. The lamp unit generates the light. The light guide plate guides the light generated from the lamp unit toward the display unit.

The lamp unit includes a lamp and a reflection plate. The lamp generates the light. The reflection plate covers the lamp to reflect a portion of the light, which advances toward the reflection plate, toward the light guide plate.

The light guide plate includes an upper surface, a lower surface and a side surface. The side surface connects the upper surface and the lower surface. The light generated from the lamp enters the light guide plate via the side surface. A first portion of the light exits from the light guide plate via the upper surface. A second portion of light advancing toward the lower surface is reflected on the lower surface to advance toward the upper surface. Thus, the second portion of light also exits from the light guide plate via the upper surface.

The backlight assembly has influence on a display quality, a size and a weight of the liquid crystal display apparatus.

Recently, a liquid crystal display apparatus that is slim and light has been developed. Particularly, many researches have been tried to reduce a width from a contour of the liquid crystal display apparatus to a boundary of a display region that displays an image.

SUMMARY OF THE INVENTION

Accordingly, the present invention is provided to substantially obviate one or more problems due to limitations and disadvantages of the related art.

The present invention provides a backlight assembly having a reduced size and enhanced optical characters.

The present invention also provides a liquid crystal display apparatus having the backlight assembly.

The backlight assembly in accordance with one aspect of the present invention includes a first lamp unit and a second lamp unit. The first lamp unit generates light. The light guide plate has a light exiting surface, a light reflecting surface and side surfaces. The light reflecting surface faces the light exiting surface. The side surfaces connect the light exiting surface and the light reflecting surface. The side surfaces include a first light incident surface. The first lamp unit being disposed adjacent to the first light incident surface, and the first light incident surface inclines inwardly from the light exiting surface to form an inclination angle that is smaller than or substantially equal to $(90-2\sin^{-1}(n_2/n_1))°$, wherein '$n_1$' is a refractive index of the light guide plate, and '$n_2$' is a refractive index of a material between the lamp and the light incident surface.

The liquid crystal display apparatus in accordance with one aspect of the present invention includes a backlight assembly, a display unit and a top chassis. The backlight assembly includes a first lamp unit and a second lamp unit. The first lamp unit generates light. The light guide plate has a light exiting surface, a light reflecting surface and side surfaces. The light reflecting surface faces the light exiting surface. The side surfaces connect the light exiting surface and the light reflecting surface. The side surfaces include a first light incident surface. The first lamp unit is disposed adjacent to the first light incident surface, and the first light incident surface inclines inwardly from the light exiting surface to form an inclination angle that is smaller than or substantially equal to $(90-2\sin^{-1}(n_2/n_1))°$, wherein '$n_1$' is a refractive index of the light guide plate, and '$n_2$' is a refractive index of a material between the lamp and the light incident surface. The display unit is disposed over the light exiting surface of the light guide plate so as to display an image by using a light that exits from the light exiting surface. The top chassis fixes the display unit to the backlight assembly.

According to the liquid crystal display apparatus of this invention, the light incident surface of the light guide plate inclines, so that the space for receiving the lamp electrode line is formed while a light entering the light guide plate is not leaked. Thus, a size of the light guide plate is reduced, and the display quality is enhanced.

BRIEF DESCRIPTION OF THE DRAWINGS

The above and other features and advantage points of the present invention will become more apparent by describing in detailed exemplary embodiments thereof with reference to the accompanying drawings, in which.

DESCRIPTION OF THE PREFERRED EMBODIMENTS

Hereinafter, the preferred embodiments of the present invention will be described in detail with reference to the accompanied drawings.

Figure 1:
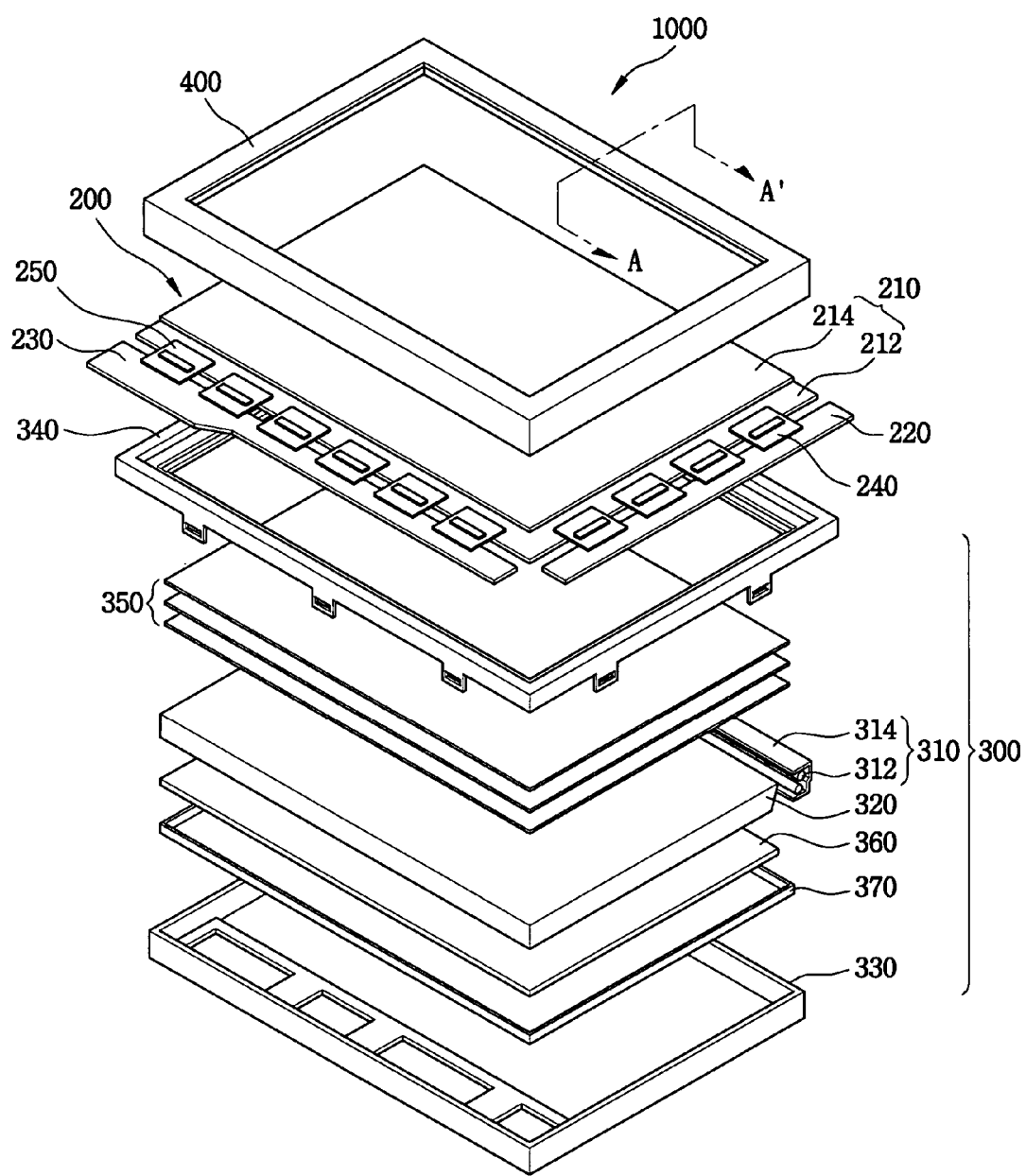
FIG. 1 is an exploded perspective view showing a liquid crystal display apparatus according to an exemplary embodiment of the present invention.
Figure 2:
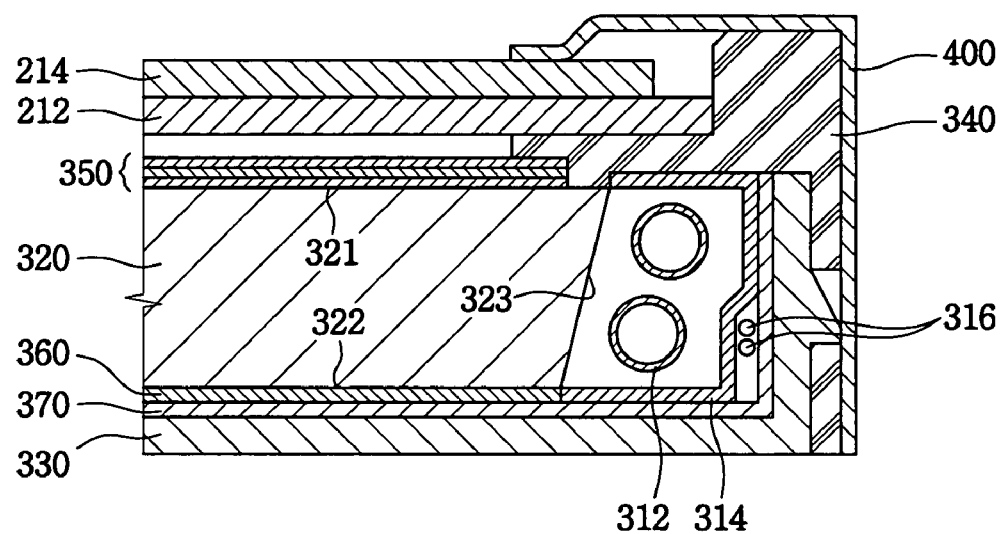
FIG. 2 is a cross-sectional view taken along the line A–A' of FIG. 1.

FIG. 1 is an exploded perspective view showing a liquid crystal display apparatus according to an exemplary embodiment of the present invention, and FIG. 2 is a cross-sectional view taken along the line A–A' of FIG. 1.

Referring to FIGS. 1 and 2, a liquid crystal display apparatus 1000 according to an exemplary embodiment of the present invention includes a display unit 200, a backlight assembly 300 and a top chassis 400. The display unit 200 displays an image. The backlight assembly 300 provides the display unit 200 with a light. The top chassis 400 fixes the display unit 200 to the backlight assembly 300.

The display unit 200 includes a liquid crystal display panel 210 for displaying an image, a gate printed circuit board (hereinafter, referred to as gate PCB) and a source printed circuit board (hereinafter, referred to as source PCB) for driving the liquid crystal display panel 210.

The liquid crystal display panel 210 includes a thin film transistor substrate 212, a color filter substrate 214 and a liquid crystal layer. The thin film transistor substrate 212 includes a thin film transistor (TFT, not shown). The color filter substrate 214 includes a red color filter (not shown), a green color filter (not shown), a blue color filter (not shown) and a common electrode (not shown). The liquid crystal layer (not shown) is interposed between the thin film transistor substrate 212 and the color filter substrate 214.

The source PCB 230 is electrically connected to the liquid crystal display panel 210 via a data tape carrier package (hereinafter, referred to as "data TCP") 250. The gate PCB 220 is electrically connected to the liquid crystal display panel 210 via a gate tape carrier package (hereinafter, referred to as "gate TCP") 240.

The backlight assembly 300 includes a lamp unit 310 and a light guide plate 320. The lamp unit 310 generates a light. The light guide plate 320 guides the light generated from the lamp unit 310 toward the liquid crystal display panel 210.

The lamp unit 310 includes at least one lamp 312 and a lamp reflector 314. The lamp 312 generates the light. The lamp reflector 314 covers the lamp 312 so as to reflect a portion of the light advancing toward the reflection plate.

The lamp unit 310 is disposed at one side surface of the light guide plate 320. Two lamp units 310 may be disposed at both of side surfaces facing each other. The lamp 312 corresponds to a cold cathode fluorescent lamp (hereinafter, CCFL) that has a long cylindrical shape. Two lamp electrode lines 316 are electrically connected to both ends of the lamp 312, respectively. The lamp reflector 314 may includes a material that has a high reflectivity. A reflection member having a high reflectivity may be coated on the lamp reflector 314. Thus, the lamp reflector 314 reflects a portion of the light that arrives at the lamp reflector 314 toward the light guide plate 320.

The light guide plate 320 includes a light exiting surface 321, a light reflecting surface 322 and four side surfaces. A light enters the light guide plate 320 exits from the light guide plate 320 via the light exiting surface 321. The light reflecting surface 322 surfaces the light exiting surface 321. One of the four side surfaces, which has the lamp unit 320 attached thereto is referred to as a light incident surface 323. The light incident surface 323 is inclined.

When the light incident surface 323 is inclined, a space for receiving the lamp electrode lines 316 is formed.

The backlight assembly 300 further includes optical sheets 350 and reflection plate 360. The optical sheets 350 are disposed on the light guide plate 320. The optical sheets 350 widens a viewing angle, and uniformizes a luminance of a light that exits from the light guide plate 320 via the light exiting surface 321. The reflection plate 360 is disposed under the light guide plate 320. The reflection plate 360 reflects a light that is leaked from the light guide plate 320 toward the light guide plate 320. A size of the light reflection plate 360 corresponds to a size of the light reflection surface 322 of the light guide plate 320.

The backlight assembly 300 further includes a receiving container 330 for receiving the lamp unit 310 and the light guide plate 320.

The receiving container 330 includes a first mold frame. The receiving container 330 may further include a bottom chassis 370 for protection of the backlight assembly 300 and dissipation of heat.

A second mold frame 340 for supporting the optical sheets 350 is disposed on receiving container 330. A sidewall of the receiving container 330 supports the second mold frame 340. The display unit 200 is disposed over the second mold frame 340. The top chassis 400 is combined with the receiving container 300, so that the display unit 200 may be fixed. The top chassis 400 prevents the display unit 200 from being separated from the liquid crystal display apparatus 1000.

Hereinafter, the backlight assembly of FIG. 1 will be explained in detail.

Figure 3:
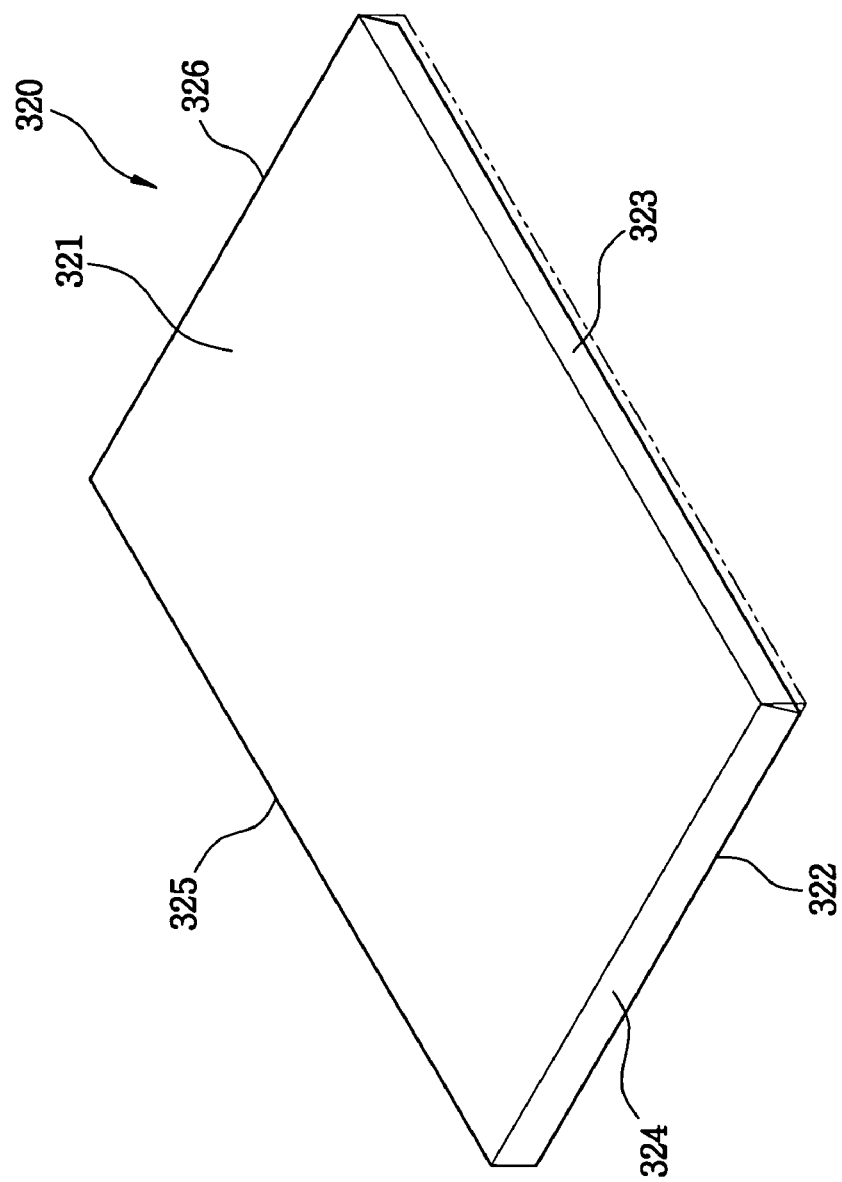
FIG. 3 is a perspective view showing a light guide plate of FIG. 1.
Figure 4:
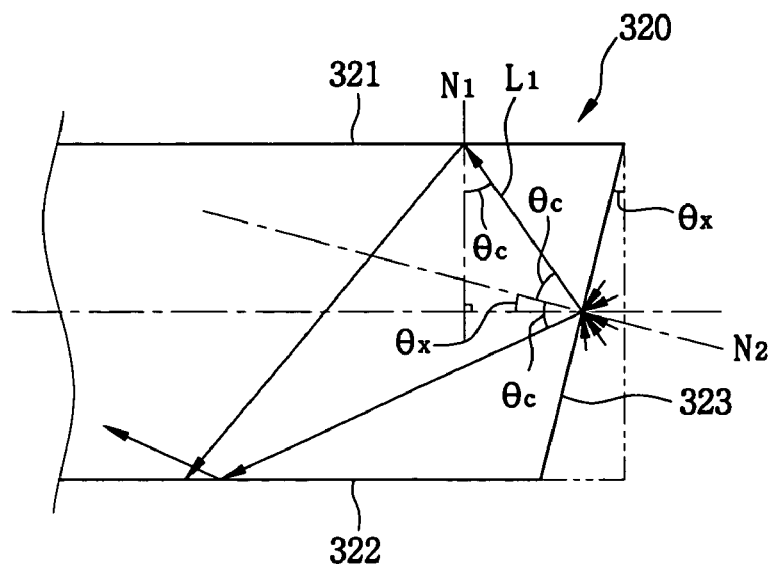
FIG. 4 is a cross-sectional view showing an edge portion of the light guide plate of FIG. 3.

FIG. 3 is a perspective view showing a light guide plate of FIG. 1, and FIG. 4 is a cross-sectional view showing an edge portion of the light guide plate of FIG. 3.

Referring to FIGS. 3 and 4, a light guide plate 320 includes a light exiting surface 321, a light reflecting surface 322, and first, second, third and fourth side surfaces 323, 324, 325 and 326. The light reflecting surface 322 reflects the light generated from the lamp unit toward the light exiting surface 321. The first, second, third and fourth side surfaces 323, 324, 325 and 326 connect the light exiting surface 321 and the light reflecting surface 322.

A light generated from the lamp unit enters the light guide plate 320 via the first side surface 323 that is referred to as a light incident surface. The light incident surface 323 inclines inwardly from the light exiting surface 321. That is, the light incident surface 323 forms an angle $\theta_x$ with respect to a normal line $N_1$ of the light exiting surface 321.

Hereinafter, a range of the angle $\theta_x$ is explained with reference to FIG. 4.

Referring to FIG. 4, a light forming an angle of a range from about 0° to about 180° with respect to the light incident surface 323 enters the light guide plate 320 via the light incident surface 323. Then, the light advances in a direction of forming an angle that is less than a critical angle $\theta_c$ with respect to a normal line $N_2$ of the light incident surface 323.

The critical angle $\theta_c$ is a maximum angle formed by an advancing direction of the light in the light guide plate 320 with respect to the normal line $N_2$. Inversely, when a light advancing in light guide plate 320 arrives at the light incident surface 323 and an advancing direction of the light forms an angle of larger than the critical angle $\theta_c$ with respect to the normal line $N_2$, the light may not exit from the light guide plate 320 but rather be totally reflected.

The critical angle $\theta_c$ may be obtained from the following expression 1 that represents the Snell's law.

$$n_1 \times \sin\theta_1 = n_2 \times \sin\theta_2, \quad \text{Expression 1}$$

wherein the $n_1$ is a refractivity of a first medium, the $n_2$ is a refractivity of a second medium, $\theta_1$ is an angle formed by an advancing direction of a light with respect to a normal line of a light incident surface in the first medium, and $\theta_2$ is an angle formed by an advancing direction of a light with respect to a normal line of a light incident surface in the second medium.

When the first medium is denser than the second medium, the refractivity $n_1$ the first medium is greater than the refractivity $n_2$ the second medium. Thus, in order to satisfy Expression 1, the angle $\theta_2$ formed by an advancing direction of a light with respect to a normal line of a light incident surface in the second medium is larger than the angle $\theta_1$ formed by an advancing direction of a light with respect to a normal line of a light incident surface in the first medium.

When a light advances from the first medium to second medium, the angle $\theta_2$ increases as the angle $\theta_1$ that is smaller than the angle $\theta_2$, increases. The critical angle $\theta_c$ corresponds to the angle $\theta_1$ when the angle $\theta_2$ reaches to 90°. Thus, the critical angle $\theta_c$ may be represented in the following Expression 2.

$$\theta_c = \sin^{-1}(n_2/n_1) \qquad \text{Expression 2}$$

That is, the critical angle $\theta_0$ is determined by both of the refractivities $n_1$ and $n_2$ of the first and second mediums respectively.

A light enters the light guide plate 320 such that the advancing direction of the light forms an angle that is less than the critical angle $\theta_c$ with respect to the light incident surface 323.

The light that enters the light guide plate 320 also arrives at the light exiting surface 321 and the light reflecting surface 322 of the light guide plate 320. The light may be totally reflected or emitted from the light guide plate according to an angle formed by the advancing direction of the light with respect to a normal line $N_1$ of the light exiting surface 321 or the light reflection surface 322.

The light is totally reflected by the light exiting surface 321 or the light reflecting surface 322 when the advancing direction of the light forms an angle that is greater than the critical angle $\theta_c$ with respect to the normal line $N_1$ of the light exiting surface 321 or the light reflecting surface 322. The light exits from the light guide plate 320 via the light exiting surface 321 or the light reflecting surface 322 when the advancing direction of the light forms an angle that is smaller than the critical angle $\theta_c$ with respect to the normal line $N_1$ of the light exiting surface 321 or the light reflecting surface 322.

A light $L_1$ that forms the critical angle $\theta_c$ with respect to the normal line $N_2$ of the light incident surface 323, forms a minimum angle with respect to the normal line $N_1$ of the light exiting surface 321.

Thus, when the light L1 forms an angle that is larger than the angle $\theta_c$ with respect to the normal line $N_1$ of the light exiting surface 321, all portion of light is totally reflected by the light exiting surface 321, so that the light does not leak from the light guide plate 320.

Thus, a condition of the angle $\theta_x$ formed by the light incident surface 323 with respect to the normal line $N_1$ of the light exiting surface 321 is expressed as the following Expression 3.

$$90 + \theta_c + \theta_c + \theta_x = 180$$

$$\therefore \theta_x = 90 - 2\theta_c \qquad \text{Expression 3}$$

Thus, when a maximum angle $\theta_x$ is substantially equal to or smaller than $(90 - 2\theta_c)°$, a light entering the light guide plate 320 is not leaked from an edge portion of the light guide plate to thereby increase the luminance.

The angle $\theta_x$ is determined by the critical angle $\theta_c$ as shown in Expression 3, and the critical angle $\theta_c$ is determined by the refractivity of the medium as shown in Expression 2. Thus, the angle $\theta_x$ is determined by the refractivity of the material of the light guide plate 320.

For example, when the light guide plate 320 comprises polymethylmethacrylate (hereinafter, referred to as PMMA) of which refractivity is 1.49, the critical angle $\theta_c$ obtained is 42.16° according to Expression 2.

Further, a maximum inclination angle $\theta_x$ of the light incident surface 323 obtained is 5.68° according to Expression 3.

Thus, when the maximum inclination angle $\theta_x$ of the light incident surface 323 is substantially equal to or smaller than about 5.68°, a light does not leak from the edge portion of the light guide plate 320 while forming a space for receiving the lamp electrode line. When the maximum inclination angle $\theta_x$ is about 5.68°, the space formed for receiving the lamp electrode line reaches its maximum.

EMBODIMENTS OF LAMP UNITS

EMBODIMENT 1

Figure 5:
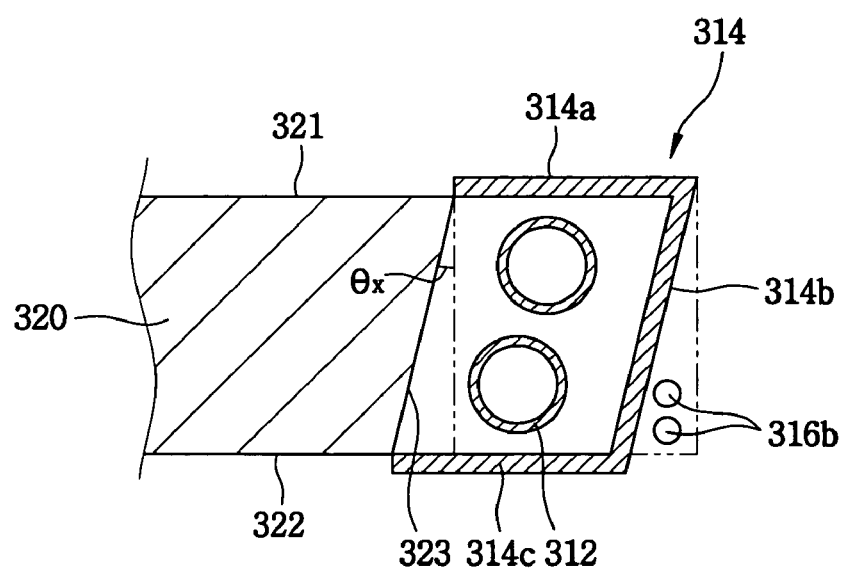
FIG. 5 is a cross-sectional view showing a lamp unit of FIG. 1 according to a first exemplary embodiment of the present invention.
Figure 6:
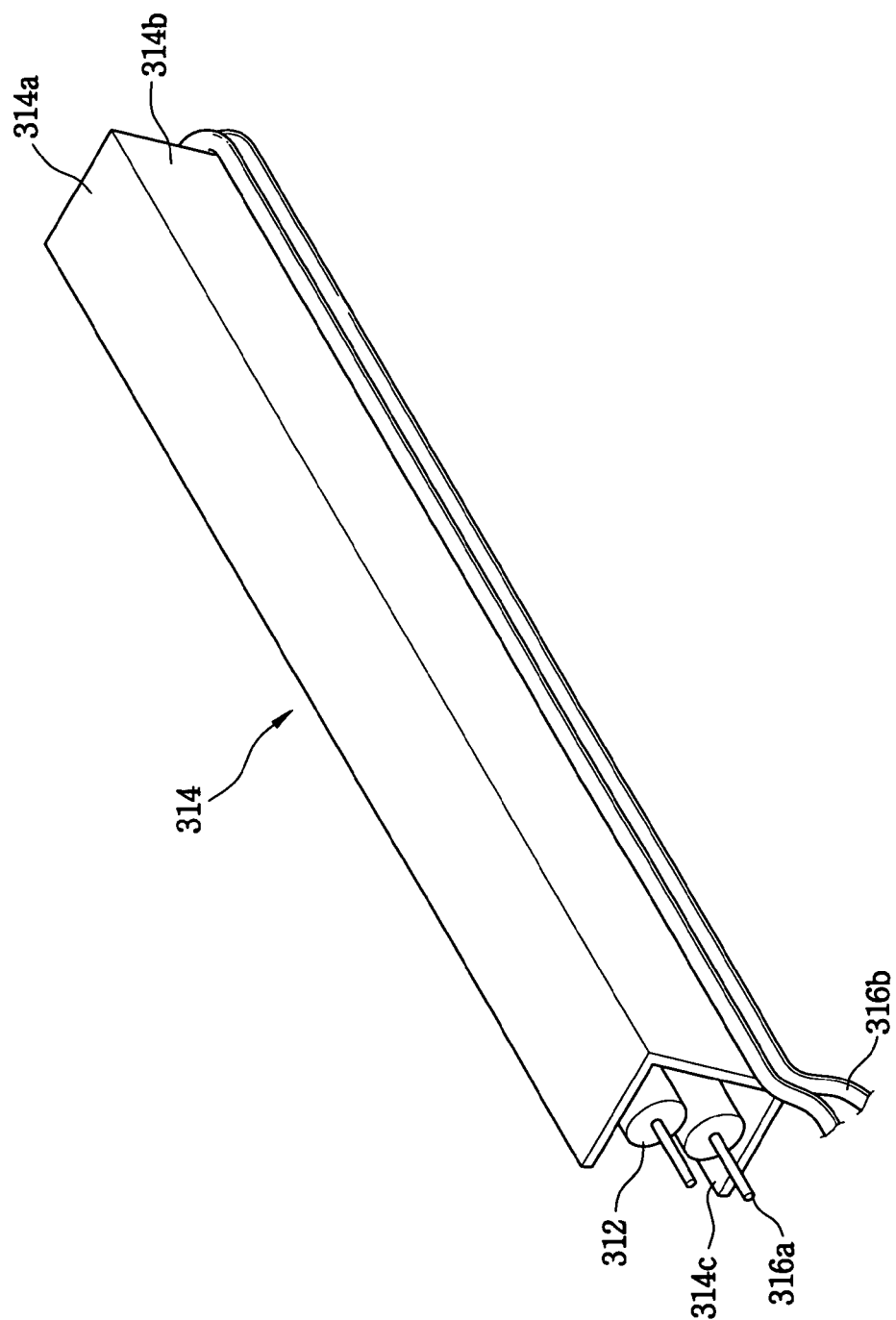
FIG. 6 is a perspective view showing a lamp unit of FIG. 5.

FIG. 5 is a cross-sectional view showing a lamp unit of FIG. 1 according to a first exemplary embodiment of the present invention, and FIG. 6 is a perspective view showing a lamp unit of FIG. 5.

Referring to FIGS. 5 and 6, the light incident surface 323 of the light guide plate 320 inclines inwardly from the light exiting surface 321. For example, when the light guide plate 320 comprises PMMA, the light guide plate 320 is inclined inwardly from the light exiting surface 321, such that the maximum inclination angle of the light incident surface 323 is smaller or equal to about 5.68°.

The lamp unit 310 is disposed at the light incident surface 323 of the light guide plate 320. The lamp unit 310 includes at least one lamp 312 and the lamp reflector 314. The lamp 312 generates light and provides the light guide plate 320 with the light. The lamp reflector 314 reflects a portion of the light toward the light guide plate 320.

Lamp electrode lines for applying driving voltage are connected to both ends of the lamp 312, respectively. The lamp electrode lines include a first electrode line 316a and a second electrode line 316b. The first electrode line 316a is connected to a first end portion of the lamp 312. The second electrode line 316b is connected to a second end portion of the lamp 312. The second electrode line 316b is pulled out along a backside of the lamp reflector 314 toward the first end portion of the lamp 312.

The lamp reflector 314 includes first, second and third lamp reflecting plates 314a, 314b and 314c. The first lamp reflecting plate 314a is disposed over the lamp 312. The first lamp reflecting plate 314a extends in parallel with the light exiting surface 321. The second lamp reflecting plate 314b is connected to the first lamp reflecting plate 314a. The second lamp reflecting plate 314b extends in parallel with the light incident surface 323. The third lamp reflecting plate 314c is connected to the second lamp reflecting plate 314b. The third lamp reflecting plate 314c is disposed under the lamp 312. The third lamp reflecting plate 314c is in parallel with the light reflecting surface 322.

The second lamp reflecting plate 314b is inclined according to the light incident surface 323, so that a receiving space for receiving the second lamp electrode line 316b is formed.

Thus, a separate space for receiving the second lamp electrode line 316b is not necessary. A tape may attach the second lamp electrode line to a portion of a backside of the second lamp reflecting plate 314b. The portion of the backside is near to the third lamp reflecting plate 314c.

The lamp 312 is spaced apart from the light incident surface 323 of the light guide plate 320 and the second lamp reflecting plate 314b. When the lamp 312 is too close to the light incident surface 323 and the second lamp reflecting plate 314b, a leakage current of the lamp 312 may increase to reduce a lifespan of the lamp 312.

When a plurality of lamps 312 is equipped, each of the lamps 312 is spaced apart from the light incident surface 323 and the second lamp reflecting plate 314b by a substantially same distance.

According to a first embodiment of the present invention, the light incident of the light guide plate inclines inwardly from the light exiting surface, such that the inclination angle formed by the light incident surface with respect to the normal line of the light exiting surface is smaller than or substantially equal to $(90-2\theta_c)°$. Thus, a light does not leak from the edge portion of the light guide plate, while forming the space for receiving the lamp electrode line. Thus, a separate space for receiving the lamp electrode line is not necessary, so that a size of the backlight assembly is reduced.

EMBODIMENT 2

Figure 7:
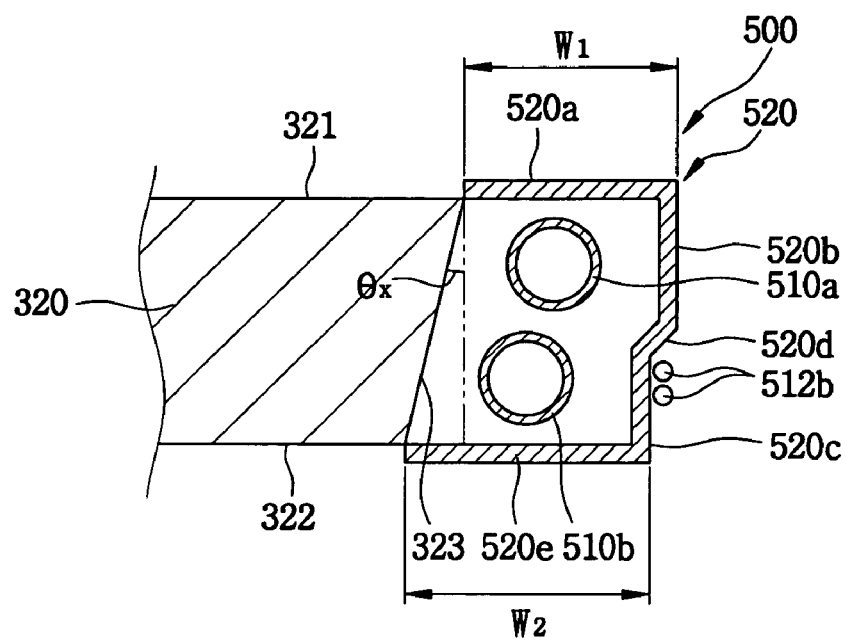
FIG. 7 is a cross-sectional view showing a lamp unit of FIG. 1 according to a second exemplary embodiment of the present invention.

FIG. 7 is a cross-sectional view showing a lamp unit of FIG. 1 according to a second exemplary embodiment of the present invention.

Referring to FIG. 7, a lamp unit according to a second exemplary embodiment of the present invention includes first and second lamps 510a and 510b, a first electrode line (not shown) and a second electrode line 512b. A driving voltage is applied to the first and second lamps 510a and 510b via the first electrode line and the second electrode line 512b. The first electrode line is electrically connected to a first end of the first and second lamps 510a and 510b. The second electrode line 512b is electrically connected to a second end of the first and second lamps 510a and 510b. The second electrode line 512b is pulled out in a direction of the first electrode line.

The first and second lamps 510a and 510b are spaced apart from a light incident surface 323 by the same distance. The light incident surface 323 is inclined inwardly from a light exiting surface 321, such that the light incident surface 323 forms an angle that is smaller or substantially equal to smaller than or substantially equal to $(90-2\theta_c)°$ with respect to a normal line of the light exiting surface 321.

The lamp unit 500 further includes a lamp reflector 520 for reflecting a light toward the light guide plate 320.

The lamp reflector 520 includes first, second, third, fourth and fifth lamp reflecting plates 520a, 520b, 520c, 520d and 520e. The first lamp reflecting plate 520a is disposed over the first and second lamps 510a and 510b. The first lamp reflecting plate 520a extends in parallel with the light exiting surface 321. The second lamp reflecting plate 520b corresponding to the first lamp 510a is connected to the first lamp reflecting plate 520a. The third lamp reflecting plate 520c corresponds to the second lamp 510b. The fourth lamp reflecting plate 520d inclines from the second lamp reflecting plate 520b to the third lamp reflecting plate 520c to connect the second lamp reflecting plate 520b with the third lamp reflecting plate 520c. The fifth lamp reflecting plate 520e is connected to the third lamp reflecting plate 520c. The fifth lamp reflecting plate 520e is disposed under the first and second lamps 510a and 510b. The fifth lamp reflecting plate 520e extends in parallel with the light reflecting surface 322 of the light guide plate 320.

A distance between the first lamp 510a and the second lamp reflecting plate 520b is substantially same as the distance between the second lamp 510b and the third lamp reflecting plate 520c, and the distance between the first lamp 510a and the second lamp reflecting plate 520b is substantially same as the distance between the first lamp 510a and the light incident surface 323. A width $W_1$ of the first lamp reflecting plate 520a is substantially same as the width $W_2$ of the fifth lamp reflecting plate 520e.

According to the present embodiment, the light incident surface 323 inclines inwardly from the light exiting surface 321, so that the third lamp reflecting plate 520c is recessed to form a space for receiving the second lamp electrode line 512b.

EMBODIMENT 3

Figure 8:
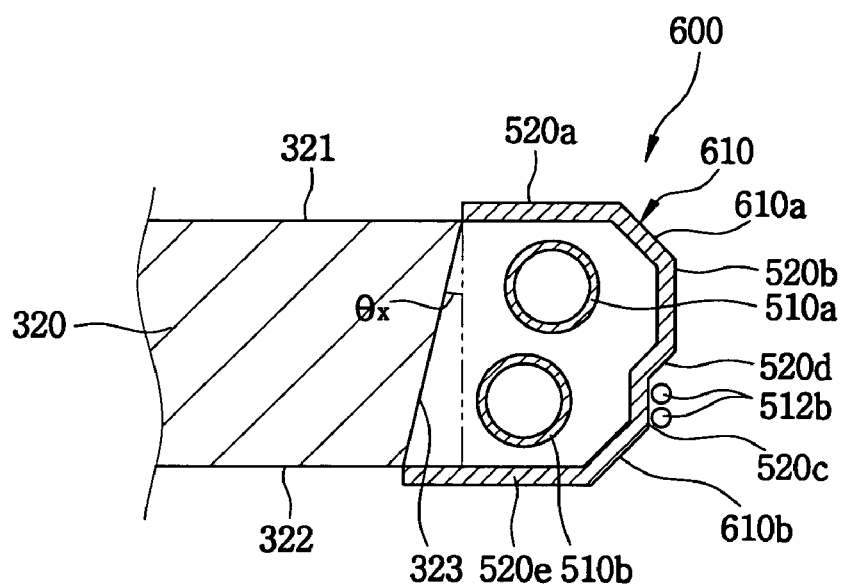
FIG. 8 is a cross-sectional view showing a lamp unit of FIG. 1 according to a third exemplary embodiment of the present invention.

FIG. 8 is a cross-sectional view showing a lamp unit of FIG. 1 according to a third exemplary embodiment of the present invention. The backlight assembly is same as in Embodiment 2 except for a lamp unit. Thus, the same reference numerals will be used to refer to the same or like parts as those described in Embodiment 2 and any further explanation will be omitted Referring to FIG. 8, a lamp reflector 610 according to a third exemplary embodiment of the present invention includes first, second, third, fourth and fifth lamp reflecting plates 520a, 520b, 520c, 520d and 520e as described in Embodiment 2. In the present embodiment, a connection portion between the first and second lamp reflecting plates 520a and 520b is chamfered to form a sixth lamp reflecting plate 610a, and the connection portion between the third and fifth lamp reflecting plates 520c and 520e is chamfered to form a seventh lamp reflecting plate 610b.

In case that the sixth and seventh lamp reflecting plates 610a and 610b are formed, the lamp unit 600 may be easily slide into or slide out from a receiving container 330 of FIGS. 1 and 2, when the lamp unit 600 is needed to be changed.

According to present invention, the light incident surface of the light guide plate inclines, so that the space for receiving the lamp electrode line is formed while a light entering the light guide plate is not leaked. Thus, a size of the light guide plate is reduced, and the display quality is enhanced.

Having described the exemplary embodiments of the present invention and its advantages, it is noted that various changes, substitutions and alterations can be made herein without departing from the spirit and scope of the invention as defined by appended claims.

What is claimed is:

1. A backlight assembly comprising:
   a first lamp unit that generates light; and
   a light guide plate including:
   a light exiting surface;
   a light reflecting surface that reflects a light toward the light exiting surface; and
   side surfaces that connect the light exiting surface and the light reflecting surface, the side surfaces including a first light incident surface,
   the first lamp unit being disposed adjacent to the first light incident surface, and the first light incident surface being inclined inwardly from the light exiting surface to form an inclination angle that is smaller than or substantially equal to $(90-2 \sin^{-1}(n_2/n_1))°$, wherein '$n_1$' is a refractive index of the light guide plate, and '$n_2$' is a refractive index of a material between the lamp and the light incident surface.

2. The backlight assembly of claim 1, wherein the refractive index $n_2$ of the material between the lamp and light incident surface is about 1.

3. The backlight assembly of claim 2, wherein the light guide plate comprises polymethylmethacrylate (PMMA).

4. The backlight assembly of claim 1, wherein the side surfaces of the light guide plate further comprises a second light incident surface that is inclined inwardly from the light guide plate to form a inclination angle that is smaller than or substantially equal to $(90-2 \sin^{-1}(n_2/n_1))°$, the backlight assembly further comprises a second lamp unit being disposed adjacent to the second light incident surface.

5. The backlight assembly of claim 1, wherein the first lamp unit comprises:
    at least one lamp spaced apart from the first light incident surface;
    a first lamp electrode line being electrically connected to a first end of the lamp;
    a second lamp electrode line being electrically connected to a second end of the lamp; and
    a lamp reflector that reflects a light toward the first light incident surface.

6. The backlight assembly of claim 5, wherein the lamp reflector comprises:
    a first lamp reflecting plate that extends in parallel with the light exiting surface;
    a second lamp reflecting plate having a first end portion and a second end portion, the first end portion being connected to the first lamp reflecting plate, the second lamp reflecting plate being in parallel with the first light incident surface; and
    a third lamp reflecting plate connected to the second end portion of the second lamp reflecting plate, the third lamp reflecting plate being in parallel with the light reflecting surface.

7. The backlight assembly of claim 6, wherein the second lamp electrode line is pulled out in a direction of the first end of the lamp along a backside of the second lamp reflecting plate, and the second lamp electrode line is fixed to the back side of the second lamp reflecting plate, such that the second lamp electrode line is adjacent to the third lamp reflecting plate.

8. The backlight assembly of claim 1, wherein the first lamp unit comprises:
    first and second lamps spaced apart from the light incident surface by a same distance; and
    a lamp reflector that reflects light generated from the first and second lamps toward the light incident surface.

9. The backlight assembly of claim 8, wherein the lamp reflector comprises:
    a first lamp reflecting plate being in parallel with the light exiting surface;
    a second lamp reflecting plate facing the first light incident surface, the first lamp being interposed between the light incident surface and the second lamp reflecting plate, the second lamp reflecting plate being connected to the first lamp reflecting plate to form a first connection portion;
    a third lamp reflecting plate facing the first light incident surface, the second lamp being interposed between the light incident surface and the third lamp reflecting plate;
    a fourth lamp reflecting plate connecting the second lamp reflecting plate and the third lamp reflecting plate; and
    a fifth lamp reflecting plate being in parallel with the light reflecting surface, the fifth lamp reflecting plate being connected to the third lamp reflecting plate to form a second connection portion.

10. The backlight assembly of claim 9, wherein a distance between the first lamp and the second lamp reflecting plate is substantially same as a distance between the second lamp and the third lamp reflecting plate.

11. The backlight assembly of claim 10, wherein the lamp unit further comprises a first electrode line that is electrically connected to a first end of the first and second lamps, and a second electrode line that is electrically connected to a second end of the first and second lamps.

12. The backlight assembly of claim 11, wherein the second electrode line is pulled out in a direction of the first end of the first and second lamps along a backside of the third lamp reflecting plate, and the second lamp electrode line is fixed to the back side of the third lamp reflecting plate, such that the second lamp electrode line is adjacent to the fifth lamp reflecting plate.

13. The backlight assembly of claim 9, wherein the first and second connecting portion are chamfered to form sixth and seventh lamp reflecting plates respectively.

14. The backlight assembly of claim 1, further comprising:
    optical sheets disposed over the light exiting surface of the light guide plate, the optical sheets enhancing optical characteristics;
    a reflection plate disposed under the light reflecting surface of the light guide plate, the reflection plate reflecting a light that is leaked from the light guide plate toward the light guide plate; and
    a receiving container receiving the lamp unit and the light guide plate.

15. A liquid crystal display apparatus comprising:
    a backlight assembly including a) a first lamp unit that generates light and b) a light guide plate having i) a light exiting surface, ii) a light reflecting surface that reflects light generated from the first lamp unit toward the light exiting surface, and iii) side surfaces that connect the light exiting surface and the light reflecting surface, the side surfaces including a first light incident surface, the first lamp unit being disposed adjacent to the first light incident surface, and the first light incident surface inclining inwardly from the light exiting surface to form an inclination angle that is smaller than or substantially equal to $(90-2 \sin^{-1}(n_2/n_1))°$, wherein '$n_1$' is a refractive index of the light guide plate, and '$n_2$' is a refractive index of a material between the lamp and the light incident surface,
    a display unit disposed over the light exiting surface of the light guide plate so as to display an image by using a light that exits from the light exiting surface; and
    a top chassis that fixes the display unit to the backlight assembly.

16. The liquid crystal display apparatus of claim 15, wherein the refractive index $n_2$ of the material between the lamp and light incident surface is about 1.

17. The liquid crystal display apparatus of claim 16, wherein the light guide plate comprises polymethylmethacrylate (PMMA).

18. The liquid crystal display apparatus of claim 15, wherein the side surfaces of the light guide plate further comprises a second light incident surface that inclines inwardly from the light guide plate to form a inclination angle that is smaller than or substantially equal to $(90-2\sin^{-1}(n_2/n_1))°$, the backlight assembly further comprises a second lamp unit being disposed adjacent to the second light incident surface.

19. The liquid crystal display apparatus of claim 15, wherein the first lamp unit comprises:
   at least one lamp spaced apart from the first light incident surface;
   a first lamp electrode line being electrically connected to a first end of the lamp;
   a second lamp electrode line being electrically connected to a second end of the lamp; and
   a lamp reflector that reflects a light toward the first light incident surface.

20. The liquid crystal display apparatus of claim 19, wherein the lamp reflector comprises:
   a first lamp reflecting plate that extends in parallel with the light exiting surface;
   a second lamp reflecting plate having a first end portion and a second end portion, the first end portion being connected to the first lamp reflecting plate, the second lamp reflecting plate being in parallel with the first light incident surface; and
   a third lamp reflecting plate connected to the second end portion of the second lamp reflecting plate, the third lamp reflecting plate being in parallel with the light reflecting surface.

21. The liquid crystal display apparatus of claim 20, wherein the second lamp electrode line is pulled out in a direction of the first end of the lamp along a backside of the second lamp reflecting plate, and the second lamp electrode line is fixed to the back side of the second lamp reflecting plate, such that the second lamp electrode line is adjacent to the third lamp reflecting plate.

22. The liquid crystal display apparatus of claim 15, wherein the first lamp unit comprises:
   first and second lamps spaced apart from the light incident surface by a same distance; and
   a lamp reflector that reflects light generated from the first and second lamps toward the light incident surface.

23. The liquid crystal display apparatus of claim 22, wherein the lamp reflector comprises:
   a first lamp reflecting plate being in parallel with the light existing surface;
   a second lamp reflecting plate facing the first light incident surface, the first lamp being interposed between the light incident surface and the second lamp reflecting plate, the second lamp reflecting plate being connected to the first lamp reflecting plate to form a first connection portion;
   a third lamp reflecting plate facing the first light incident surface, the second lamp being interposed between the light incident surface and the third lamp reflecting plate;
   a fourth lamp reflecting plate connecting the second lamp reflecting plate and the third lamp reflecting plate; and
   a fifth lamp reflecting plate being in parallel with the light reflecting surface, the fifth lamp reflecting plate being connected to the third lamp reflecting plate to form a second connection portion.

24. The liquid crystal display apparatus of claim 23, wherein a distance between the first lamp and the second lamp reflecting plate is substantially same as a distance between the second lamp and the third lamp reflecting plate.

25. The liquid crystal display apparatus of claim 24, wherein the lamp unit further comprises a first electrode line that is electrically connected to a first end of the first and second lamps, and a second electrode line that is electrically connected to a second end of the first and second lamps.

26. The liquid crystal display apparatus of claim 25, wherein the second electrode line is pulled out in a direction of the first end of the first and second lamps along a backside of the third lamp reflecting plate, and the second lamp electrode line is fixed to the back side of the third lamp reflecting plate, such that the second lamp electrode line is adjacent to the fifth lamp reflecting plate.

27. The liquid crystal display apparatus of claim 23, wherein the first and second connecting portion are chamfered to form sixth and seventh lamp reflecting plates, respectively.

28. The liquid crystal display apparatus of claim 15, further comprises:
   optical sheets disposed over the light exiting surface of the light guide plate, the optical sheets enhancing optical characteristics;
   a reflection plate disposed under the light reflecting surface of the light guide plate, the reflection plate reflecting a light that is leaked from the light guide plate toward the light guide plate; and
   a receiving container receiving the lamp unit and the light guide plate.

* * * * *